June 27, 1967  YASUICHI FUKUSHIMA  3,327,381
METHOD OF FORMING A FOAM FIRE-EXTINGUISHER
INCLUDING DEEP DRAWING THE TANK BODY
Filed Nov. 13, 1964  4 Sheets-Sheet 3

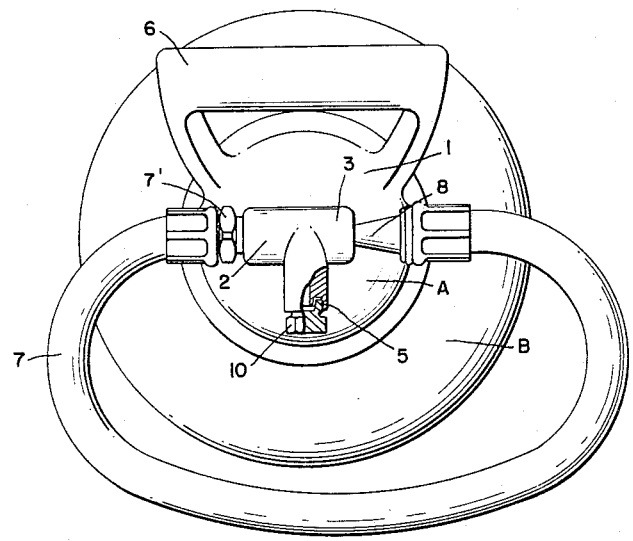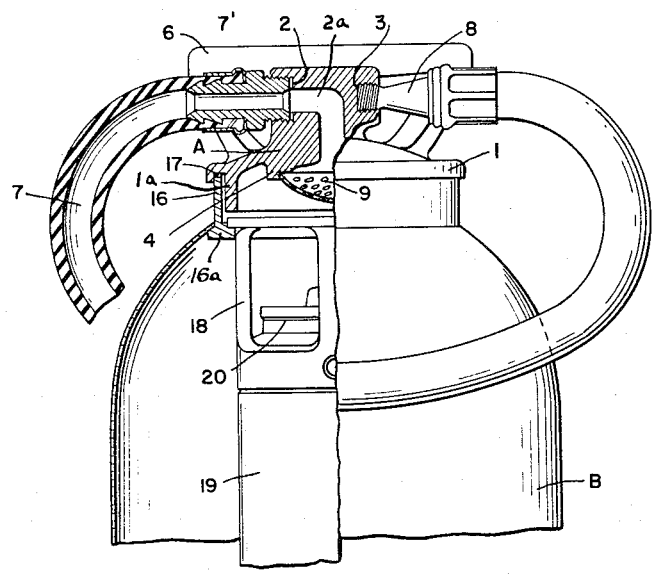

INVENTOR
YASUICHI FUKUSHIMA

BY Wenderoth, Lind & Ponack
ATTORNEYS

June 27, 1967  YASUICHI FUKUSHIMA  3,327,381
METHOD OF FORMING A FOAM FIRE-EXTINGUISHER
INCLUDING DEEP DRAWING THE TANK BODY
Filed Nov. 13, 1964  4 Sheets-Sheet 4

INVENTOR
YASUICHI FUKUSHIMA

BY *Wenderoth, Lind and Ponack*

ATTORNEYS

United States Patent Office 3,327,381
Patented June 27, 1967

3,327,381
METHOD OF FORMING A FOAM FIRE-EXTIN-
GUISHER INCLUDING DEEP DRAWING THE
TANK BODY
Yasuichi Fukushima, Suita-shi, Japan, assignor to The
Hatsuta Manufacturing Co., Ltd., Osaka, Japan
Filed Nov. 13, 1964, Ser. No. 410,919
Claims priority, application Japan, Feb. 15, 1964,
39/7,958
3 Claims. (Cl. 29—469)

This invention relates to a method of manufacturing foam fire-extinguishers and the foam fire-extinguishers obtained thereby.

According to conventional methods for making foam fire-extinguishers, it has been necessary to make, in separate operations, a cap to be attached to the neck of the outer tank, a recess in the cap for joining a hose to the cap, a recess in which a nozzle can be inserted, a recess for a strainer, and a tapped hole for an automatic safety valve, and in addition to these, surface finishing, thread cutting and other operations have been necessary.

Therefore, a great amount of labor, time and money have been expended. Moreover, because fire-extinguisher outer tanks have been made by bending ordinary steel sheets into cylinders and joining both ends by spot welding and soldering, and then dishing other steel sheets and forming other sheets hemispherically in a power press respectively, and attaching these, by welding and soldering, to upper and lower sections of the cylinders as bottoms and tops respectively, much added labor, time and money have been expended.

In addition, because these tubes cannot be made seamless, they become corroded and damaged at the seams, and because they cannot be made without holes for attachments, they tend to leak liquid and gas under pressure from holes which occur due to corrosion.

In order to avoid these defects, attempts have been made in the past to make fire-extinguisher outer tanks by pressing them out of a single sheet. To make these tanks by pressing them, it is necessary to use steel sheets of superior quality which are quite costly, and even when manufacturers have used such steel sheets, they have been unable to succeed in making satisfactory tanks from both a technical and a practical standpoint. That is the reason why only ordinary steel sheets have been used and why, even when producing a large number of these tanks, it has been too expensive to make these tanks by pressing them. It has been the desire of manufacturers for a long time to manufacture these bodies economically by pressing them, even if it is necessary to use steel sheets of superior quality and high cost.

It is an object of this invention to manufacture fire-extinguishers of high quality with seamless outer tanks at low cost, by pressing the tanks from a single sheet of metal.

The method of manufacturing foam fire-extinguishers according to this invention comprises:

(1) Forming a cover body having a recess for joining a hose to the body, a recess in which a nozzle can be inserted, a recess for a stainer, and a tapped hole for an automatic safety valve, and having thereon a handle, is made in a single operation as on unitary body by molding synthetic resin;

(2) Forming an outer tank by:

(a) Firstly, pressing a circular cut steel plate having a thickness sufficient for deep drawing, and composed of C 0.032–0.040%, Mn 0.26–0.37%, P 0.008–0.012%, S 0.011–0.017%, and the remainder Fe, to recite strength of which is 30–32 Kg./mm.², which can be stretched 46–53%, and the Erichsen test value of which is 12.5–13.8 mm., into a first tank-shaped body, the ratio of the outside diameter of the upper edge to the height of which is about 1 to 0.8;

(b) Secondly, further pressing the first tank-shaped body into a second tank-shaped body, the ratio of the outside diameter of the upper edge of which to the outside diameter of the first tank-shaped body is about 0.8 to 1, and the ratio of the height to the outside diameter of the upper edge of which is about 1.3 to 1;

(c) Thirdly, pressing the second tank-shaped body into a third tank-shaped body, the ratio of the outside diameter of the upper edge of which to the outside of the second tank-shaped body is about 0.8 to 1, and the ratio of the height to the outside diameter of the upper edge of which is about 2 to 1; and (d) Fourthly pressing the third tank-shaped body into a fourth tank-shaped body, the ratio of the outside diameter of the upper edge of which to the outside diameter of the third tank-shaped body is about 0.8 to 1, and the ratio of the height to the outside diameter of the upper edge of which is about 3 to 1; and (3) Forming an opening in the fourth tank-shaped body, mounting the cover body in said opening, and adhering a domed bottom plate and a bottom handle to the open end of the tank-shaped body.

Other and further objects of the invention will become apparent from the following specification and claims, taken together with the accompanying drawings, in which:

FIG. 2 is a top plan view of the fire-extinguisher of FIG. 1, partly in section;

FIG. 3 is an enlarged elevation view of the upper part of the fire-extinguisher of FIG. 1, partly in section;

Figure 4:
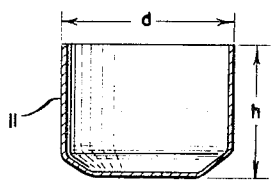
FIGS. 4 and 5 are respectively sectional elevation and perspective views of a first tank-shaped body formed by a first tank body forming series of steps according to the method of the present invention.
Figure 5:
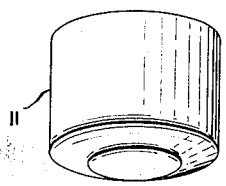
Figure 6:
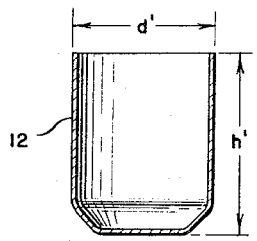
Figure 7:
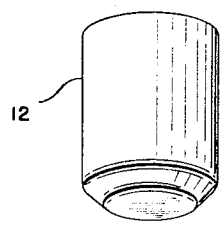
Figure 8:
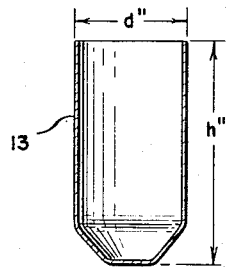
Figure 9:
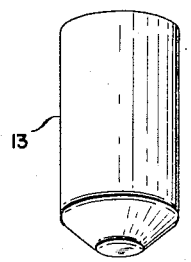
Figure 10:
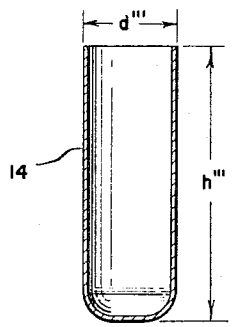
Figure 11:
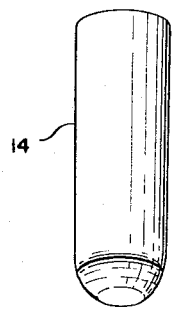
Figure 12:
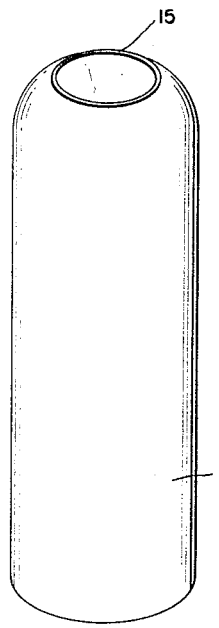
Figure 13:
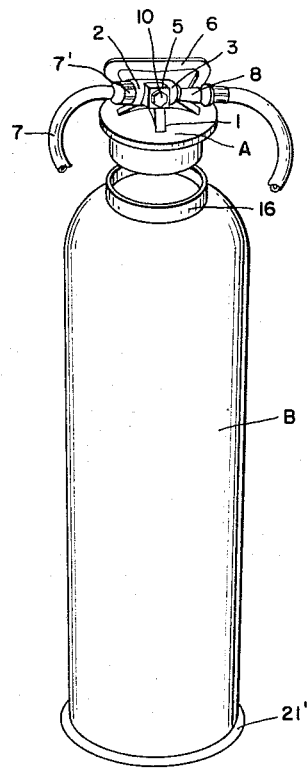

FIGS. 6 and 7 are views similar to FIGS. 5 and 6 of a second tank-shaped body formed from the first tank-shaped body of FIGS. 4 and 5;

FIGS. 8 and 9 are views similar to FIGS. 6 and 7 of a third tank-shaped body formed from the second tank shaped body of FIGS. 6 and 7;

FIGS. 10 and 11 are views similar to FIGS. 8 and 9 of a fourth tank-shaped body formed from the third tank-shaped body of FIGS. 8 and 9;

FIG. 12 is a perspective view of the fire-extinguisher tank body formed from the fourth tank-shaped body of FIGS. 10 and 11; and FIG. 13 is an exploded view of the finished fire-extinguisher.

Figure 1:
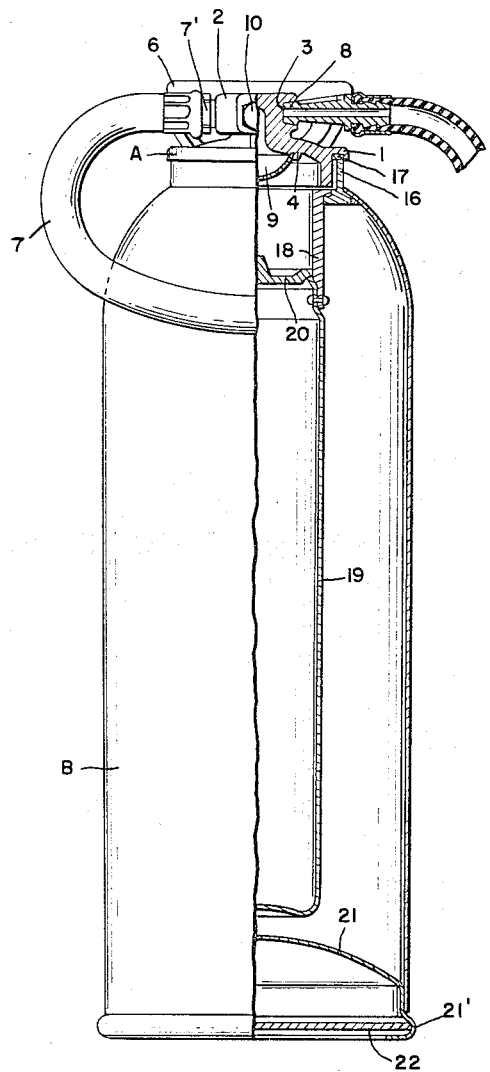
FIG. 1 is an elevation view, partly in section, of a foam-type fire-extinguisher constructed by the method of the present invention.

As seen in FIGS. 1–3, the fire-extinguisher has a cover body A having a cap portion 1 adapted to fit over the mouth of a tank, and having a recess 2 for receiving one end of a hose connector 7'. A hose 7 is connected to the other end of the hose connector, and it has a nozzle 8 on the other end thereof which fits into a blind recess 3 for holding the nozzle 8 during storage of the fire-extinguisher. A bore 2a extends through the cover body A into a recess 4 opening out of the bottom of the body A and over which a strainer 9 is fitted. Extending laterally of the bore 2a is a tapped hole 5 in which is threaded a safety valve 10. A handle 6 is formed integrally with the cover body A. The cover body A is molded of a synthetic resin, such as polycarbonate.

Depending from the cap portion 1 of the cover body A is a collar 1a which is externally threaded and which is threaded into an internally threaded collar 16 secured to the opening 15 in the top of the tank body B by welding or the like. An inwardly projecting lip 16a provides a support for the upper portion of an inner container 18 having a lead cover 20 such as is conventional in foam type fire-extinguishers.

The tank body B is a seamless cylinder, and has a domed bottom 21 secured in the bottom thereof by welding or the like, and the bottom 21 has a head 21' therearound which secures a bottom handle 22 across the hollow within the domed bottom 21.

The fire-extinguisher tank body is formed by deep drawing a steel sheet having a composition 0.032 to 0.040% C, 0.26 to 0.37% Mn, 0.008 to 0.12% P, 0.011 to 0.017% S, and the remainder Fe, and having a tensile strength of 30–32 kg./mm.$^2$, an elongation of from 46–53%, and an Erichsen test value of 12.5–13.8 mm. Starting with a circular plate 620 mm. in diameter and 1.2 mm. thick, the plate is first deep drawn in a drawing press at a pressure of 120 tons into a first tank-shaped body 11 as shown in FIGS. 4 and 5 having an outside diameter $d$ at the upper edge thereof of 318 mm. and a height $h$ of 225 mm., and having a U-shaped cross section. The ratio of the diameter to the height is about 1 to 0.8.

The first tank-shaped body 11 is next deep drawn in a drawing press at a pressure of 120 tons into a second tank-shaped body 12 as shown in FIGS. 6 and 7 having an outide diameter $d'$ at the upper edge thereof of 261 mm. and a height $h'$ of 335 mm., and having a U-shaped cross section. The ratio of the outside diameter to the outside diameter of the first tank-shaped body is about 0.8 to 1, and the ratio of the height to the outside diameter is about 1.3 to 1.

The second tank-shaped body 12 is next deep drawn in a drawing press at a pressure of 120 tons into a third tank-shaped body 13 as shown in FIGS. 8 and 9 having an outside diameter $d''$ at the upper edge thereof of 212 mm. and a height $h''$ of 417 mm., and having a U-shaped cross section. The ratio of the outside diameter to the outside diameter of the second tank-shaped body is about 0.8 to 1, and the ratio of the height to the outside diameter is about 2 to 1.

The third tank-shaped body 13 is next deep drawn in a drawing press at a pressure of 120 tons into a fourth tank-shaped body 14 as shown in FIGS. 10 and 11 having an outside diameter $d'''$ at the upper edge thereof of 177 mm. and a height $h'''$ of 520 mm., and having a U-shaped cross section. The ratio of the outside diameter to the outside diameter of the third tank-shaped body is about 0.8 to 1, and the ratio of the height to the outside diameter is about 3 to 1.

The fourth tank-shaped body 14 is then turned upside down and the opening 15 is made in the end which is then at the top. The collar 16 is then secured in the opening 15 and the fire-extinguisher assembled as described above.

The method of the invention has great industrial advantages as compared with conventional foam fire-extinguishers and methods of manufacturing them.

These advantages are:

(1) In this invention, because the cover body A having the cap, the recess for the hose coupling, the recess for the nozzle, the recess for the strainer, a tapped hole for the automatic safety valve and a handle is made in one integral body by molding synthetic resin, it can be made in only one operation, thereby avoiding such drawbacks as wasting much labor, time and money by forming all of these recesses separately, and additionally avoiding the necessary surface treatment and thread cutting which must be done if the cover body is of metal. Thus, the method of this invention enables manufacture of the cover body A within such time, and with only as much labor and expense as is involved in making a cap alone in conventional methods.

(2) With the method of this invention, manufacturers can manufacture fire-extinguisher bodies of high quality at extremely low costs, by using a press, using superior, expensive steel for deep drawing, instead of ordinary steel sheets used in conventional methods, yet still saving much labor, and expense by the simplification and efficiency of the manufacturing processes.

The results of my tests during making of the body B, in this invention as compared with the making of a conventional body are as follows:

(1) Number of processes and hours used in the methods of this invention as compared with conventional methods:

|  | Conventional method of manufacturing fire-extinguisher bodies, Processes | Manufacturing method of a fire-extinguisher body B according to this invention, Processes |
|---|---|---|
| (a) Relating to Metal Plate | 32 | 14 |
| (b) Relating to Hydraulic Processes | 8 | 6 |
| (c) Relating to Painting | 5 | 5 |
| (d) Relating to Construction | 9 | 6 |
| Total | 52 | 23 |

Number of processes are 46% decreased. Hours are shortened 39%. Costs are lowered remarkably.

(2) Costs involved in method according to this invention compared with those in conventional methods.

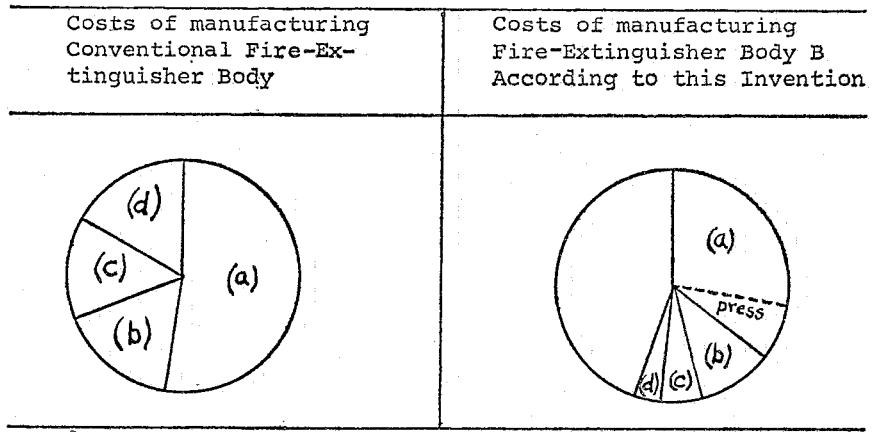

(a) represents costs relating to metal plate.
(b) represents costs relating to hydraulic processes.
(c) represents costs relating to painting.
(d) represents costs relating to construction.

(3) Because the tank body B made according to the method of this invention is seamless, the strength necessary to resist pressure is excellent in addition to reducing the work hours necessary to fabricate it remarkably, and there is no danger of corrosion at the seam and subsequent bursting as occurs in conventional tank bodies, and because the tank body B has no hole therein for attachments, there is no fear of leakage of pressed gas or medical liquid, from holes for attachments, as can occur in conventional tank bodies. In addition, because the quality of materials is equal and mechanically precise at every portion, the durability of the tank body B is extremely high, and, because the tank body B does not need to have such attachments as a recess in which a nozzle is to be held, a recess for a hose joint, an automatic valve and a handle etc., the weight of it is very low, and it is simple and easy to handle, and there is no difficulty or danger in handling it. Moreover, its manufacture is greatly simplified in this respect.

(4) In the method of this invention, because the fire extinguisher tank body is constructed with the top and cylindrical wall in one body, the tank body B there is a great saving in time, labor and expenses in spot welding and soldering, as compared with making a fire extinguisher cylindrical wall, a top and a bottom separately one by one, and the painting of the tank body B can be carried out easily and with excellent results. Thus not only can its durability be increased, but also it can be manufactured far more economically.

(5) According to the results of my experiments, it has been ascertained that a tank body B of excellent quality can be most efficiently manufactured in large quantities at extremely low cost in fewer hours, just by the method of making the tank body in four drawing steps. In spite of using expensive steel sheets for deep drawing, remarkably durable fire-extinguisher bodies can be manufactured in a large quantity at very low costs, by making the outside diameter of the upper edges with the described ratio one after another, and making ratio of the outside diameter of the upper edge to the height of the drawn body with the ratio as set forth above one after another.

(6) In this invention because the cover body A and the tank body B are respectively made in one body and the cover body A is connected tightly and securely to the tank body B by a female screw and a packing, and a domed bottom and a bottom handle are secured to the tank body B, the fire-extinguisher has many advantages as compared to conventional fire-extinguishers:

(a) The overall weight is reduced about 20%, and, as described above, the construction of it is so systematized that the ease of manufacturing, transporting, using and operating it are very great. For instance, it is convenient for a user to hold the bottom handle due to the domed bottom plate secured to the tank body B.

(b) The body B has no welded joints so that its strength becomes about 20% greater than a seamed tank, and its durability is far greater, and its maintenance is much easier than a conventional fire-extinguisher.

(c) Because the cover body A is composed of synthetic resin, the quantity of foam produced increases about 15%, due to the decrease of the inner resistance. In addition, extinguishing efficiencies increase about 20% as a consequence of improvement of chemical reaction. Moreover the cover body A can be painted in any desired color. When it is white, it is easy to locate the foam fire-extinguisher even in the dark of night.

(d) The health and sanitary conditions of the workers who make fire-extinguishers are improved far more satisfactorily by such systematized manufacture, because they are not exposed to toxic gas during welding and soldering operations as in the past.

It has been ascertained that the manufacturing efficiency by the method of this invention is about 6 times greater than that with conventional methods, because one can manufacture a fire-extinguisher within ten seconds by the method of this invention, while it takes at least one minute to make one by conventional methods. As this invention can be used to produce foam fire-extinguishers of the highest quality at extremely low costs, in fewer hours, it is a great advance in the fire-extinguisher manufacturing art.

What is claimed is:

1. A process of making a foam fire-extinguisher comprising the steps of forming a cover body having a recess therein for joining a hose to the body, a recess in which a nozzle can be held, a recess for a strainer, and a tapped hole for an automatic safety valve, and having a handle thereon, by molding the cover body in a single operation as a unitary body of synthetic resin;

forming an outer tank body by first, deep drawing a flat circular steel sheet having a composition of 0.032 to 0.040% C., 0.26 to 0.37% Mn, 0.008 to 0.012% P, 0.011 to 0.017% S, and the remainder Fe, the tensile strength of which is 30–32 kg./mm.$^2$, which can be stretched 46–53%, and the Erichsen test value of which is 12.5–13.8 mm., into a first tank-shaped body, the ratio of the outside diameter of the upper edge to the height of which is about 1 to 0.8;

second, deep drawing the said first tank-shaped body into a second tank-shaped body, the ratio of the outside diameter of the upper edge of which to the outside diameter of the first tank-shaped body is about 0.8 to 1, and the ratio of the height to the outside diameter of the upper edge of which is 1.3 to 1;

third, deep drawing the second tank-shaped body into a third tank-shaped body, the ratio of the outside diameter of the upper edge of which to the outside diameter of the second tank-shaped body is about 0.8 to 1, and the ratio of the height to the outside diameter of the upper edge of which is about 2 to 1; and fourth, deep drawing the third tank-shaped body into a fourth tank-shaped body, the ratio of the outside diameter of the upper edge of which to the outside diameter of the third tank-shaped body is about 0.1 to 1, and the ratio of height to the outside diameter of the upper edge of which is about 3 to 1; and cutting an opening in the closed end of said fourth tank-shaped body, mounting a domed bottom plate in the open end of the fourth tank-shaped body and mounting a handle across the end of the fourth tank shaped body in said domed bottom plate; and assembling the cover body in the opening cut in said fourth tank-shaped body and mounting a hose in the hose receiving recess, a strainer in the strainer recess, and a safety valve in the tapped hole.

2. A process as claimed in claim 1 in which said deep drawing is carried out at a pressure of 120 tons.

3. A process of forming a tank body for a foam fire-extinguisher comprising the steps of first, deep drawing a flat circular steel sheet having a composition of 0.032 to 0.040% C, 0.26 to 0.37% Mn, 0.008 to 0.012% P, 0.011 to 0.017% S, and the remainder Fe, the tensile strength of which is 30–32 kg./mm.$^2$, which can be stretched 46–53%, and the Erichsen test value of which is 12.5–13.8 mm., into a first tank-shaped body, the ratio of the outside diameter of the upper edge to the height of which is about 1 to 0.8;

second, deep drawing the said first tank-shaped body into a second tank-shaped body, the ratio of the outside diameter of the upper edge of which to the outside diameter of the first tank-shaped body is about 0.8 to 1, and the ratio of the height to the outside diameter of the upper edge of which is about 1.3 to 1;

third, deep drawing the second tank-shaped body into a third tank-shaped body, the ratio of the outside diameter of the upper edge of which to the outside diameter of the second tank-shaped body is about 0.8 to 1, and the ratio of the height to the outside diameter of the upper edge of which is about 2 to 1;

fourth, deep drawing the third tank-shaped body into a fourth tank-shaped body, the ratio of the outside diameter of the upper edge of which to the outside diameter of the third tank-shaped body is about 0.8 to 1, and the ratio of the height to the outside diameter of the upper edge of which is about 3 to 1; and cutting an opening in the closed end of said fourth tank-shaped body, whereby a bottom plate; a bottom handle can be mounted in the open end of the tank body and a cover lid with a hose attached thereto and a strainer and a safety valve can be assembled in the opening cut in the closed end for forming a fire-extinguisher.

References Cited
UNITED STATES PATENTS

| | | | |
|---|---|---|---|
| 159,883 | 2/1875 | Bayless | 72—347 |
| 2,350,491 | 6/1944 | Butler et al. | 72—347 X |
| 2,985,342 | 5/1961 | Focht | 222—394 |

JOHN F. CAMPBELL, *Primary Examiner.*

THOMAS H. EAGER, *Examiner.*